Figure 1:
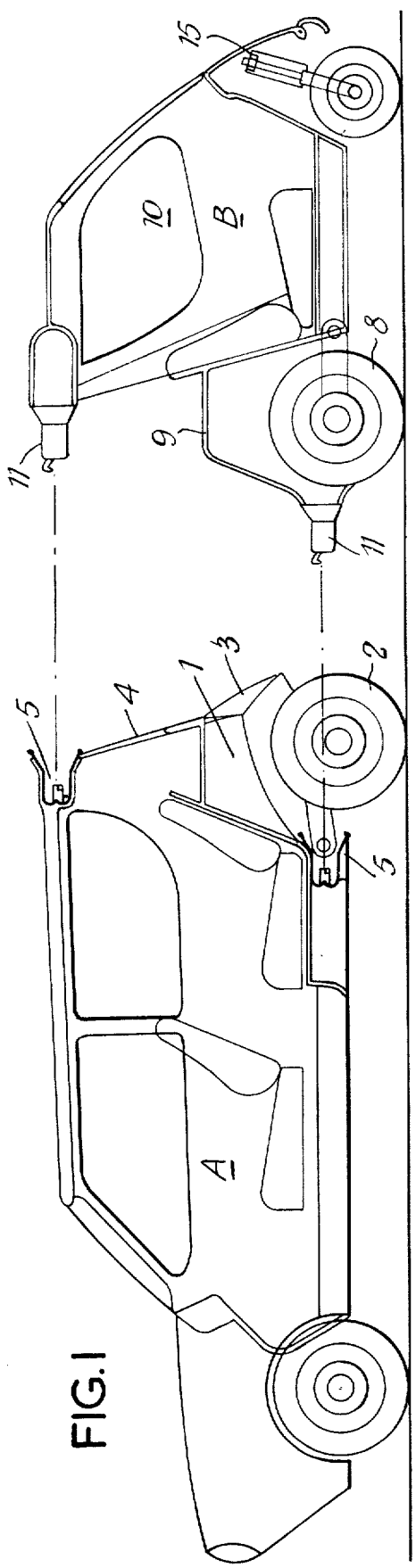

United States Patent [19]
Herbert

[11] 3,889,770
[45] June 17, 1975

[54] WHEELED VEHICLES

[76] Inventor: Hugh Grahame Herbert, 1B Limpsfield Ave., London, England

[22] Filed: June 20, 1973

[21] Appl. No.: 371,586

[52] U.S. Cl. .............................................. 180/14 R
[51] Int. Cl. ............................................ B60d 1/00
[58] Field of Search ..... 180/11, 12, 13, 14 R, 14 A, 180/14 B, 14 D, 14 E, 89 R; 296/28 K

[56] References Cited
UNITED STATES PATENTS

| | | | |
|---|---|---|---|
| 1,804,257 | 5/1931 | Greenley | 180/14 A |
| 2,727,581 | 12/1955 | Wright | 180/12 |
| 3,255,837 | 6/1966 | Wolf | 180/14 R |
| 3,719,244 | 3/1973 | Miller et al. | 180/14 R |

FOREIGN PATENTS OR APPLICATIONS

| | | | |
|---|---|---|---|
| 1,199,630 | 8/1965 | Germany | 180/14 R |

*Primary Examiner*—Trygve M. Blix
*Assistant Examiner*—Gregory W. O'Connor
*Attorney, Agent, or Firm*—Imirie, Smiley & Linn

[57] ABSTRACT

The invention provides a composite road vehicle comprising major and minor powered units which are drivable separately and interlockable, preferably back-to-back, in a manner permitting power from driven wheels of the minor unit to be transmitted to the road as an adjunct to power from the major unit.

2 Claims, 5 Drawing Figures

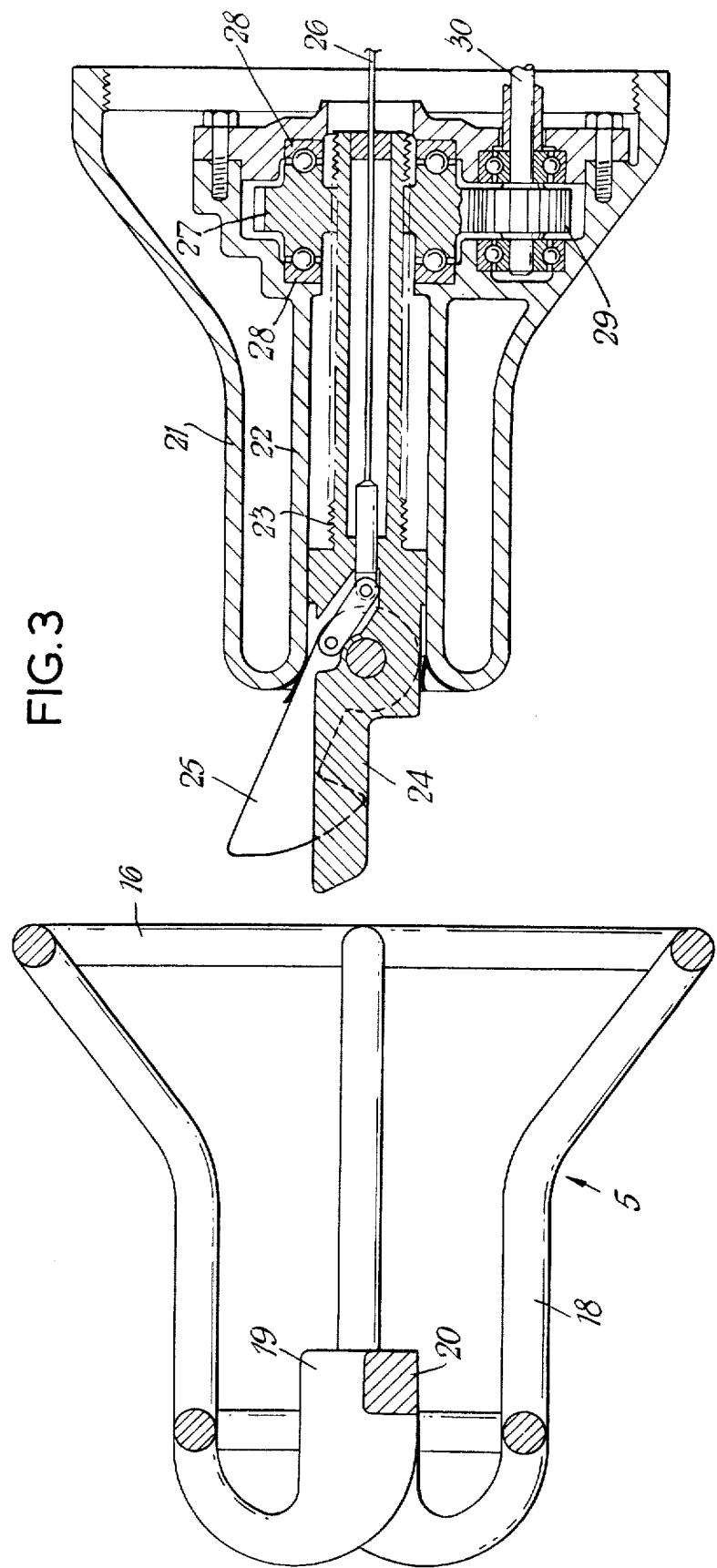

WHEELED VEHICLES

This invention relates to improvements in self-propelled wheeled vehicles.

It is primarily but not exclusively concerned with full scale passenger cars driven by internal combustion engines, but the principle of the invention is applicable to other types of vehicle with other types of prime mover and even to scale models and toys.

Modern traffic conditions in towns call for small easily manoeuverable passenger vehicles, while long distance touring calls for vehicles with ample passenger and luggage accommodation.

It is a principal object of the invention to provide a composite vehicle capable of meeting both sets of requirements.

According to the invention, from one aspect, I provide a composite vehicle comprising, (as a major unit) a substantially conventional self-powered passenger vehicle and (as a minor unit) a smaller self-powered passenger vehicle adapted from interlocking attachment with the major unit in a manner permitting power from the wheels of the minor unit to be transmitted to the road.

According to the invention, from another aspect, I provide a composite vehicle comprising a major unit with a self-contained power unit driving the front wheels, and a minor unit with a self-contained power unit and rear wheel drive attachable to the back of the major unit with its driven wheels between and axially or substantially axially aligned with the rear wheels of the major unit.

From a mere restricted point of view my invention provides a composite passenger vehicle comprised by a substantially conventional I.C.E. front wheel drive passenger car (major unit) having at the rear anchorage means for the rear of a subsidiary three-wheel vehicle (minor unit) forming part of the composite vehicle whose rear wheels are driven by a smaller motor, which wheels (when attached to the conventional car) lie between and in substantial alignment with the rear wheels of that conventional car so as to be capable of transmitting power to the road.

The motor of the minor unit small I.C.E. or a battery-powered electric motor.

It is preferred that the attachment between the two units of the vehicle be self-locking, so that simple reversing of one vehicle against the back of the other suffices to ensure secure mutual anchorage.

It is also preferred that provision is made for raising the non-driven steering wheel or wheels of the minor unit from the road when it is attached to the major unit.

Pneumatic or hydraulic power means, which may form part of the suspension system of one or both of the units, may be employed to ensure correct relative heights for a connection or separation procedure.

Figure 2:
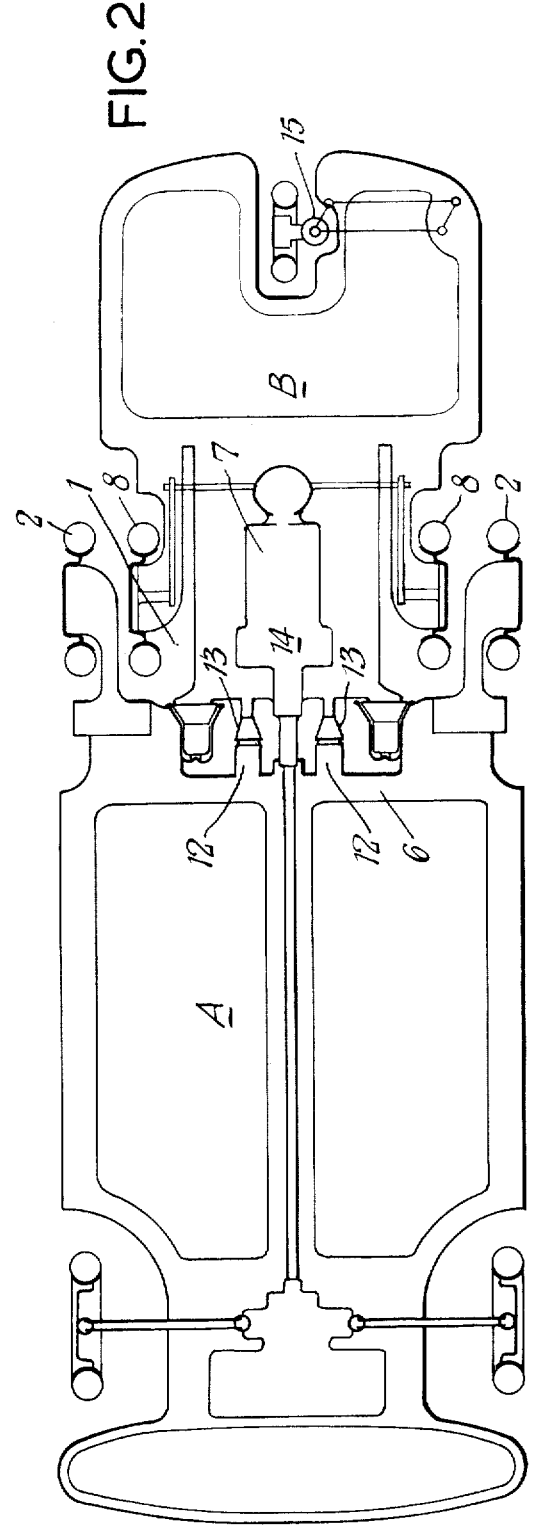
Figure 5:
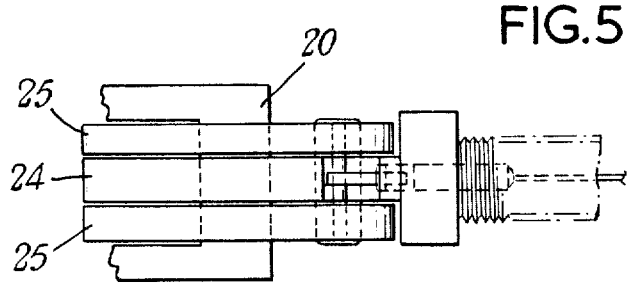
Figure 4:
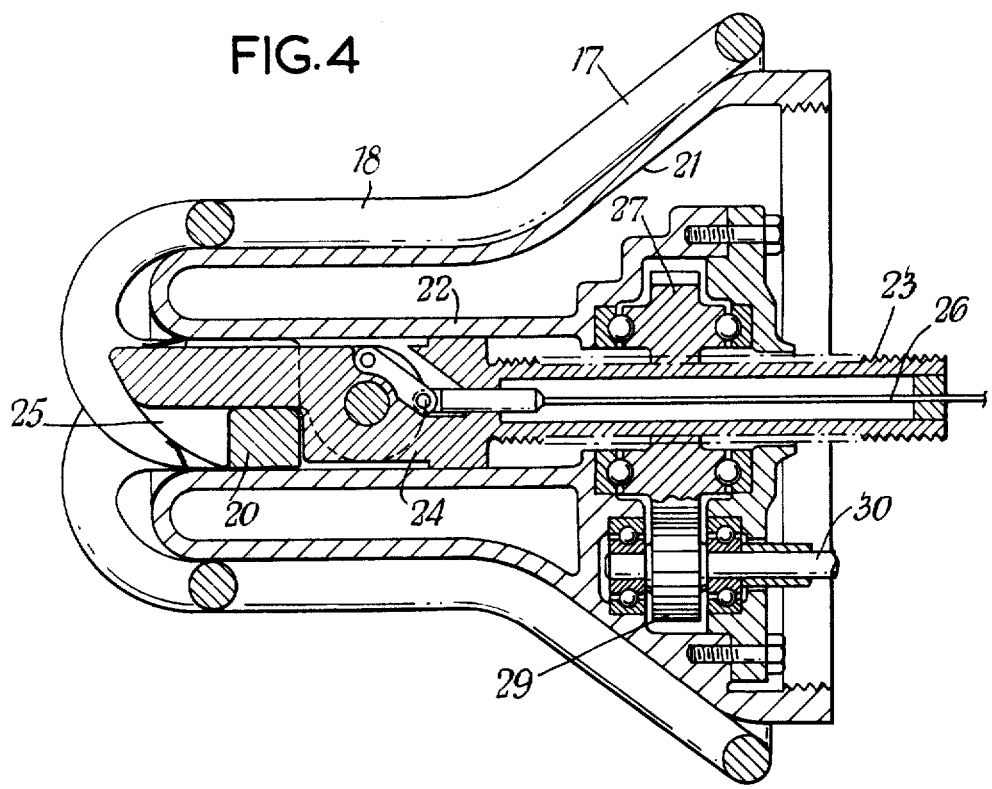

The above and other features of the invention are incorporated in a preferred form of vehicle, which will now be described purely by way of example with reference to the accompanying drawings, in which:

FIG. 1 is a diagrammatic, partly cut-away side elevation of the two units of the vehicle in back-to-back relationship, FIG. 2 is a diagrammatic, partly cut-away plan view of the two units of the vehicle coupled together, FIG. 3 is a central vertical section, to an enlarged scale, of the two parts of a coupling disengaged, FIG. 4 is a similar view to FIG. 3 showing the coupling fully engaged, and FIG. 5 is a plan view of latches employed in the coupling.

A virtually conventional 4 to 6 seater motor car A of about 1400 c.c. engine capacity, and with front wheel drive, is modified at its rear end to provide an accessible plenum space 1 between and above the rear wheels 2 in the location of the normal luggage boot.

This space has fold-away flaps 3, roller shutters, or the like enabling it to be used for luggage containment in the ordinary manner beneath a large sliding rear window 4.

Anchorage sockets 5, the having generous lead-in mouths, are provided in the rear panel structure of the car just below roof level and a substantial cross-frame member 6 is provided ahead of the rear wheels carrying similar anchorage sockets. The form of the sockets is immaterial to the overall concept of the invention, but the kind of devices envisaged are illustrated in FIGS. 3 to 5 and will be described hereafter.

A three-wheel subsidiary vehicle B has rear-wheel drive and is powered by an air-cooled twin cylinder engine of, say 600 c.c. 7.

The track of the rear wheels 8 of this vehicle is considerably less than that of the parent motor car, and these wheels and the engine or motors are carried in a rearward extension 9 from the driving compartment 10 of the vehicle.

Locking fittings 11 for engagement with the sockets 5 in the parent vehicle are provided just below roof level at the back, and at about rear hub level.

The single front steered wheel of the subsidiary vehicle is upwardly and downwardly movable by an hydraulic jack 15, which may be conveniently operated by a manual lever (not shown). The steering column may constitute such a lever.

The parent and subsidiary vehicles are both equipped with front and rear lights, fuel tanks, batteries and so on (not shown) to enable them to be operated completely independently.

The positioning of the inter-engaging couplings of both vehicles in relation to their rear wheels is such that, when they are joined together back-to-back, the rear wheels 8 of the subsidiary vehicle (of the same size as those of the parent vehicle) are axially aligned with the parent vehicle rear wheels 2 and lie just within them.

Inter-engageable brake, throttle and electrical lines are led to male couplings 12 on the parent vehicle and female couplings 13 on the subsidiary vehicle in a manner known per se, and a torque converter or similar device 14 is provided to enable the driving power of the subsidiary vehicle to be supplementary to that of the parent.

A suitable form of coupling device is shown in FIGS. 3 to 5.

The socket or female part 5 carried by the parent vehicle is fabricated from steel and has a wide circular mouth 16, a tapering portion 17, a parallel sided portion 18 and a re-entrant portion 19 carrying a keeper bar 20.

The part 5 is constructed in open cage-like form to avoid its becoming clogged with mud.

The mating male part 11 is likewise made from steel and has an outer wall 21, conforming to the interior shape of the part 5, and a central hollow part 22.

Sliding within the part 22 is a centrally drilled threaded rod 23 formed at its end with a nose 24.

A pair of latch members 25 are pivoted to the nose 24 and these may be lifted to the position shown in FIG. 3 by a control cable 26.

An externally toothed nut 27 sandwiched between ball bearings 28 is meshed with a gear 29, which is rotatable manually or by motor through the shaft 30.

In operation of the coupling the latches 25 extended from the male part may be deliberately raised, as shown in FIG. 3, or they may be in the lowered position, as in FIG. 4, and be freely pivotable.

On backing one vehicle towards the other the male parts of the lower couplings 11 of the subsidiary vehicle enter the lower female parts 5 on the main vehicle and the latches 25 are either deliberately lowered over the keeper bar 20 or rise and fall over the bar due to their shape and weight.

The shafts 30 are then rotated to withdraw the threaded rods 23 into the hollow parts 22 of the female parts to the position shown in FIG. 4, thus locking the latches 25 securely.

The front wheel of the subsidiary vehicle is now lowered by the hydraulic jack 15, and the upper couplings are entered and secured in the same manner as the lower ones.

On raising the front wheel of the subsidiary vehicle it remains securely locked to the main vehicle.

The uncoupling procedure is the reverse of that described above.

It will be apparent that the composite vehicle provides, in the uncoupled state, a family passenger car and a three-wheeler run-about; and in the coupled state a four-wheel drive vehicle with twin rear wheels and a rearward extension capable of accepting extra seats or luggage.

Generously opening rear windows of both vehicles and screen for the subsidiary vehicle make access between them and luggage stowage easily available, while convertible seating in either or both vehicles can make for considerable flat decking area.

A modified version of the above vehicle has the subsidiary vehicle battery-driven by a dynamotor.

This ensures silent and fume-free travel for a limited mileage in town.

When coupled to the parent vehicle, an inertia switch or the like may be employed to add the power of the dynamotor to that of the I.C. engine of the parent on ascending hills, and to re-charge the battery of the subsidiary vehicle (the dynamotor acting as a brake) on descending them.

It will be understood that the invention is not restricted to the details of the specific embodiment described which may be varied without departing from the scope of the appended claims.

What I claim is:

1. A composite vehicle comprising a major unit with a self-contained power unit driving the front wheels, and a minor unit with a self-contained power unit and rear wheel drive attachable to the back of the major unit with its driven wheels between and substantially axially aligned with the rear wheels of the major unit.

2. A composite passenger vehicle comprised by a substantially conventional I.C.E. front wheel drive passenger car constituting a major unit and, having at the rear anchorage means for the rear of a subsidiary three-wheel vehicle, constituting a minor unit, forming part of the composite vehicle, whose rear wheels are driven by a smaller motor, which wheels, when attached to the conventional car, lie between and in substantial alignment with the rear wheels of that conventional car so as to be capable of transmitting power to the road.

* * * * *